A. RASMUSSEN.
HACKSAW BLADE FOR METAL SAWING MACHINES.
APPLICATION FILED APR. 3, 1916.
1,214,589.
Patented Feb. 6, 1917.
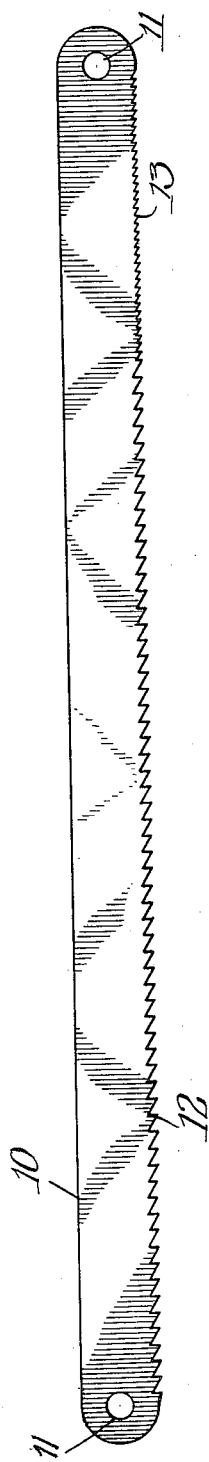

UNITED STATES PATENT OFFICE.

ANDREW RASMUSSEN, OF RACINE JUNCTION, WISCONSIN.

HACKSAW-BLADE FOR METAL-SAWING MACHINES.

1,214,589.

Specification of Letters Patent. Patented Feb. 6, 1917.

Application filed April 3, 1916. Serial No. 88,424. REISSUED

*To all whom it may concern:*

Be it known that I, ANDREW RASMUSSEN, a citizen of the United States, and a resident of Racine Junction, in the county of Racine and State of Wisconsin, have invented certain new and useful Improvements in Hacksaw-Blades for Metal-Sawing Machines; and I do hereby declare that the following is a full, clear, and exact description thereof, reference being had to the accompanying drawings, and to the characters of reference marked thereon, which form a part of this specification.

This invention relates to a novel hack saw blade for metal hack sawing machines, and the invention consists in the matters hereinafter set forth and more particularly pointed out in the claims.

The single figure of the drawing illustrates in side elevation a hack saw blade embodying my invention.

As shown in said drawing, 10 designates the body of the saw blade provided with the usual apertures 11 at its ends for attachment to the hack saw frame. In accordance with my invention, the hack saw blade is provided with two sets of teeth 12, 13, respectively, the teeth 12 being the coarsest and occupying nearly the full length of the saw blade, and the teeth 13 being fine and being located at one end of the saw blade. The finer teeth 13 are made as fine as practical conditions will permit, they being of a pitch to operate in the nature of a coarse filing edge, while the coarser teeth may be made of any pitch desired, depending upon the nature and character of the work. For instance, the fine teeth may run in the neighborhood of eighteen to thirty-two teeth to the inch, while the coarser teeth may run from slightly below that number to the practical maximum pitch.

My improved saw blade is adapted to be used with hack sawing machines of that type wherein the saw frame is lifted at the end of the cutting stroke so that the blade will be freed from the bottom of the saw cut during the non-cutting stroke, thereby avoiding wear on the saw blade teeth during the non-cutting stroke. The said fine teeth 13 are located at that end of the saw blade which first descends upon the work at the beginning of the cutting stroke of the saw. The purpose of providing the saw blade with the finer teeth at the entering end thereof, or at the end which is first brought into contact with the work in the beginning of the cutting stroke of the saw, will be apparent from a consideration of the following.

I have found it an advantage to make the saw teeth relatively large in order to secure rapid cutting of the stock. The softer the material to be cut, the coarser the teeth may be practically made. When said teeth are made as large as good practice dictates in this respect, there is great danger of breaking the relatively long sharp teeth when the saw is brought to bear upon the work. There is also danger of so breaking the saw teeth when starting to cut square stock or small round stock, by reason of the fact that the longer or coarser teeth tend to interlock with and dig into the abrupt corners of the square stock or into the very small round stock in the first few strokes of the saw, with the result that one or more of the teeth at the entering end of the saw are likely, for this reason, to become broken. If one or more teeth be thus broken at the beginning of the stroke, the same is likely to become embedded in the material. Inasmuch as the material of the blade is very hard, the teeth not broken will come into contact with the broken tooth or teeth, with the result that all of the teeth are injured. In some instances, a small portion of a tooth thus broken off is embedded in the stock at one side of the cut, with the result that the blade is dulled at one side throughout its entire length. A blade thus damaged will not cut straight, with the result that an imperfect cut is produced. In order to avoid the breaking of the first tooth or few teeth of the saw at the beginning of its operation on square stock or small round stock, when the teeth are all of the same size and relatively coarse, it is a common practice for the attendant to hold the saw lightly against the work until the sharp corners have been cut through. This necessitates rather close supervision on the part of the attendant and increases the cost of the work. However, when the saw is run at high speed it is practically impossible to so hold the saw without jarring it on the work, which often causes the teeth to break.

In the use of a saw blade made in accordance with my invention, the blade is lowered to the work in such timed relation to the working parts of the machine that the first part of the blade edge which strikes the work is that occupied by the finer teeth. The said finer teeth are so short that there is no danger of them being broken by contact with the sharp or angular portions of square stock or with small round stock. In fact, the teeth may be made so fine that they may fairly correspond to a rather coarse file edge. However, said fine teeth are of such character as to produce a sufficient wearing effect in the traverse of this portion of the blade edge across the work that the angular portions are more or less smoothed before the same is struck by the longer teeth. Thereby danger of breaking the longer teeth by contact with such angular portions of the work is avoided. Moreover, the danger of breaking the longer saw teeth by reason of forcible contact of the saw blade with the work is also avoided, inasmuch as the portion of the saw blade which first comes into contact with the work and which thereby bears the brunt of any shock or jar due thereto is that bearing the finer teeth which are not subject to breakage.

Another advantage of the finer saw teeth at the entering end of the blade is that the reciprocating mechanism of the saw may be so timed relatively to the raising and lowering mechanism by which the saw blade is raised from the work at the end of the cutting stroke and lowered thereto at or before the beginning of the next cutting stroke that the saw blade may be lowered against the work just before the end of the non-cutting stroke of the saw, so that the full length of the blade edge is utilized in the cutting stroke. In prior hack saw practice, the saw blade is not lowered to the work until after the beginning of the cutting stroke, so that under said prior practice a portion of the cutting stroke is lost.

It thus becomes apparent that not only is the saw blade more durable by reason of less likelihood to breakage, and that the cost of the work is reduced by reason of a saving of supervising service on the part of the attendant, but that, by the provision of the shorter teeth, which enables the saw blade to be lowered upon the work prior to the end of the non-cutting stroke, the capacity of the saw for work is increased. Preferably, and as herein shown, the cutting ends of both the finer and the coarser teeth are located in the same plane.

I claim as my invention:—

1. A hack saw blade for metal sawing machines of that class in which the blade is relieved from the bottom of the saw cut during the non-cutting stroke of the saw, said blade being provided throughout the principal portion of its length with coarse teeth, and provided at its entering end with a short length of fine teeth, said latter teeth being so fine as to prevent breakage thereof when brought into contact with the work or against relatively sharp or angular surfaces, but sufficiently long as to present a coarse file-like cutting surface.

2. A hack saw blade for metal sawing machines of that class in which the blade is relieved from the bottom of the saw cut during the non-cutting stroke of the saw, said blade being provided throughout the principal portion of its length with coarse teeth of uniform length and provided at its entering end with a short length of coarse file-like cutting teeth, the cutting ends of which are in the plane of the cutting ends of the coarse teeth.

In testimony that I claim the foregoing as my invention, I affix my signature in the presence of two witnesses, this 29 day of March, 1916.

ANDREW RASMUSSEN.

Witnesses:
Thos. Allen,
H. N. Bacon.